Patented Jan. 18, 1949

2,459,164

UNITED STATES PATENT OFFICE 2,459,164

WEBBABLE, STRIPPABLE COATING COMPOSITION

William Henry Holst, United States Navy, and George Russell Hersam, Takoma Park, Md.

No Drawing. Application September 23, 1944, Serial No. 555,568

11 Claims. (Cl. 260—32.8)

(Granted under the act of March 3, 1883, as amended April 30, 1928; 370 O. G. 757)

This invention relates to coating compositions and has particular relation to a water and moisture-vapor impervious coating composition which is capable of being webbed across an orifice, as by spraying.

An object of the present invention is to provide a water and moisture-vapor impervious coating composition which is sprayable onto, webbable across and strippable from such bases as metal, wood, paper, glass, ceramics, rubber, synthetic rubber, leather, fabrics, vegetable matter and plastics, including phenolic resins, urea formaldehyde resins, paints and other coating compositions, which are not adversely affected by the particular solvent forming a part of the present coating composition. The word "strippable" is intended to mean that quality of the present coating composition which permits it to be readily stripped from an object onto which it has been coated. The word "webbable" is intended to mean that characteristic of the present coating composition which permits it to be webbed or bridged across an orifice, void or other irregular surface.

Another object of the invention is to provide a sprayable, webbable, strippable coating composition which is water impervious and has an extremely low rate of moisture-vapor transmission when coated onto a base in a thickness such as from 15 to 25 mils.

A further object of the invention is to provide a coating composition which can be sprayed onto a base in such a manner as to form a webbed film, thereby permitting large cavities, orifices, indentations and other irregular surfaces to be bridged by a film of the present coating composition.

Still another object of the invention is to provide a coating composition film which adheres to the object on which it is coated and yet may be readily and easily removed by stripping, thereby leaving the original surface clean and unharmed.

A still further object of the invention is to provide a coating composition which will retain its physical characteristics for all practical purposes at high temperatures such as 180° F. and at low temperatures such as —60° F.

An additional object of the invention is to provide a coating composition film characterized by its high tensile strength and toughness.

Another object of the invention is to provide a protective coating composition film, which is capable of protecting the base on which it is coated from corrosion and which has a cushioning effect, thereby being capable of absorbing minor shocks and abrasions encountered in normal handling which might injure the uncoated object.

Another object of the invention is to provide a coating composition film which is capable of providing a finished sealed package per se and does not ordinarily require further packaging or sealing as is the case with the usual moisture-proof films or coatings used in present packaging methods.

Another object of the invention is to provide a coating composition film having characteristics which permit its use in present commercial hand-spraying equipment and present automatic conveyor-type spray mechanisms.

A further purpose is to make a webbable, strippable coating composition comprising vinyl chloride-vinyl acetate copolymer, having a vinyl chloride content ranging from 85 to 95 percent and an appreciable amount, preferably 4.7 percent to not more than 16.6 percent on the non-volatile components of vinylidene chloride-acrylo nitrile copolymer, preferably having a vinylidene chloride content ranging from 85 to 88 percent, said components being dissolved in a volatile solvent to give a solution of sprayable viscosity.

A further purpose is to employ in the coating composition just referred to, vinyl chloride-vinyl acetate copolymer having a vinyl chloride content ranging from 85 to 90.5 percent and also vinyl chloride-vinyl acetate copolymer having a vinyl chloride content ranging from 90.5 to 95.0 percent.

The coating composition of the present invention comprises vinyl chloride-vinyl acetate copolymers, vinylidene chloride-acrylo nitrile copolymers, a non-drying, hydrophobic substance, a plasticizer and a stabilizer, these components being dissolved in a sufficient amount of solvent to give a solution of the desired viscosity for applying the composition to an object as by spraying, dipping or pouring.

The coating composition of the present invention preferably comprises by weight from 30 to 80 parts resin selected from the group consisting of vinyl chloride-vinyl acetate copolymers, vinylidene chloride-acrylo nitrile copolymers and mixtures thereof, and a sufficient amount of non-drying, hydrophobic substance, plasticizer, and stabilizer to make up to 100 parts non-volatiles, the foregoing components being dissolved in sufficient amount solvent to give a solution of the desired viscosity.

A coating composition made in accordance with the present invention comprises by weight from 30 to 80 parts resin including up to 20 parts vinylidene chloride-acrylo nitrile copolymer, an amount of vinyl chloride-vinyl acetate copolymer having a vinyl chloride content ranging from 90.5 to 95% which will dissolve in the quantity of solvent employed, and sufficient vinyl chloride-vinyl acetate copolymer having a vinyl chloride content ranging from 85.0 to 90.5% to bring the balance up to the desired amount. The remainder of the non-volatiles preferably consists of a plasticizer, a stabilizer in an amount up to 6 parts per 100 parts of the resins and a non-drying hydrophobic substance in sufficient amount to bring the balance of the solids content up to 100 parts total.

This component provides a water impervious, sprayable, webbable, strippable film having an extremely low rate of moisture-vapor transmission.

The word "plasticizer" is intended to include any compound which has a plasticizing, elasticizing effect on the present coating composition without having a deleterious effect thereon. Among the plasticizers which may be used are esters of hydroxy carboxylic acids, carboxylic acids and inorganic acids. Among the particular plasticizers adaptable for use are long chain dialkyl glycollates, diaryl glycollates, alkyl aryl glycollates, dialkyl phthalates, dialkyl sebacates and aryl substituted phosphates. The preferred plasticizers include butyl phthalyl butyl glycollate which is sold under the trade name "Santicizer B–16," tricresyl phosphate, dibutyl phthalate, diallyl phthalate, diethyl hexyl phthalate (known as "Flexol D. O. P.") and dibutyl sebacate.

Although an alkyl ketone solvent such as methyl ethyl ketone is preferred, any solvent which is a vehicle for the components and has no deleterious effect on the base surface may be used. It has been found that a mixture of not less than 70 parts, preferably 85 parts, methyl ethyl ketone and not more than 30 parts, preferably 15 parts, methyl iso-butyl ketone is particularly suitable when the coating is applied during exposure to weather.

The mineral oil is added to provide an anti-corrosive, non-drying agent and any substance which is hydrophobic in character may be used. For example, it has been found that highly refined mineral oils such as "Nujol" and "Fractol" provide satisfactory anti-corrosive agents, although polar type oils, such as mineral oil containing petroleum sulphonates produced by partially sulphonating the petroleum, of which one commercial material is known as "Rust Ban," are also satisfactory. The non-drying hydrophobic agent gradually exudes from the internal surface of the film to form a thin protective layer on the base object. While the incorporation of a non-drying, anti-corrosive agent is important when a metallic base is being coated with the present coating composition, it need not be employed when a non-corrodable base is being coated.

The use of a stabilizer improves the stability of the resins by preventing their decomposition when they are subjected to high temperatures. Any suitable stabilizer, such as crude lead stearate, which is sold commercially as "Stabilizer A" prepared by the Goodrich Rubber Company of Akron, Ohio, may be employed.

The basic film-forming component of a preferred coating composition is the vinyl chloride-vinyl acetate copolymer having a vinyl chloride content ranging from 85.0% to 90.5%. One such copolymer within this range is known by the trade name "VYNS." We have discovered that the incorporation of vinyl chloride-vinyl acetate copolymer having a vinyl chloride content ranging from 90.5% to 95% increases the tensile strength, toughness, chemical resistance and abrasive resistance of the film. We have also found that the last-mentioned copolymer contributes some film-forming characteristics, increases the water and moisture-vapor imperviousness of the film and decreases the water and moisture-vapor transmission. One such copolymer is known by the trade name "VYNW"; another such copolymer is known by the trade name "VYNU."

We have further discovered that vinylidene chloride-acrylo nitrile copolymers, one such containing vinylidene chloride within the range of 85 to 88 percent being sold under the trade name "Saran F-120," contribute materially to the webbing characteristics of the present coating composition.

The present invention provides a composition of matter which is particularly adapted for coating a protective layer on articles which must be protected from exposure to water, moisture, sand, grit, abrasion, shock and other injurious factors. The present coating composition has found particular application in the protection of metallic ordnance devices and parts which are exposed to the corrosive action of sea water, sea water spray, moisture and fog, the abrasive action of sand, dirt, grit and the physical shocks resulting from transportation.

Another advantage possessed by the present coating composition is its ability to web across an orifice or other irregular surface of relatively large area while being sprayed. Thus a bomb-rack or a gun may be spray-coated with the present coating composition and completely enveloped thereby so that none of the interior mechanisms are contacted by the coating film. This is due to the novel webbing characteristics of the present composition which permit it to bridge across large open areas such as crevices, voids, indentations and orifices. Since an article may be completely enveloped by the present coating composition, a finished and sealed package may be obtained thereby. The addition of a hydrophobic oil to the coating compound provides anti-corrosive properties by reason of the oil exuding from the coated film onto the surfaces of the article in a thin layer. Another advantage is that the coated film may be readily and easily stripped from the base article without the adherence of small particles of the coated film thereon.

The following examples illustrate a number of coating compositions which have been prepared and utilized in accordance with the present invention.

Example 1

| | Parts by weight |
|---|---|
| VYNW | 13.6 |
| VYNS | 40.9 |
| Santicizer B16 | 11.3 |
| Fractol A | 27.4 |
| Saran F120 | 6.8 |
| (Non-volatile content) | 100.0 |

The non-volatile components were dissolved in 355 parts methyl ethyl ketone solvent, thereby providing a coating solution comprising by weight about 22% solids and 78% solvent.

This coating composition was sprayed onto a metal bombrack having stainless steel sideplates, cadmium plated steel suspension hooks, cast aluminum alloy electrical receptacles and a cast bronze hoisting bracket. A pressure type spray gun having an adjustable nozzle with a wide spray-range was used. This type of nozzle is preferred because it lends itself to a wide range of air adjustment. The spraying was accomplished in an enclosed space in order to reduce the amount of air currents which disturb the webbing characteristics of the composition being sprayed. The atmosphere in the enclosed space was at room temperature and at low humidity. The spraying was initiated with light fine threads or webs of the composition. In this manner a fine web-like film was bridged across the voids and irregular surfaces of the bombrack. After the rack was completely enveloped by a fine webbed film, the spray gun was adjusted to increase the size of the spraying particles and the initial enveloped film was thoroughly sealed by being built up to a thickness of about 20 mils.

A similar bombrack having a visible moisture indicator of the silicagel-cobalt chloride type attached thereto was coated as described above. After one month immersion in a 3.5% salt solution of synthetic seawater at room temperature, the moisture indicator revealed that there had been no water transmission through the film. Another bombrack coated as above was exposed for three months to water vapor at 95% relative humidity and 100° F. The moisture indicator revealed that the moisture vapor transmission was practically negligible. The tested film was then stripped from the bombracks and it was noted that it had not adhered to the metal at the areas of contact. Examination of the bombracks revealed no evidence of corrosion or salt crustation. It was also observed that a thin film of oil had spread over the surface of the bombracks.

A steel projectile, similarly located, was subjected to an accelerated weathering test consisting of alternate exposures to 3.5% salt spray at room temperature and ultra-violet light in order to simulate conditions involving one year of outdoor exposure to humid weather. Upon examination, the projectile displayed no evidence of corrosion.

*Example 2*

| | Parts by weight |
|---|---|
| VYNW | 15 |
| VYNS | 45 |
| Flexol D. O. P | 24 |
| Rust Ban | 14.8 |
| Stabilizer A | 1.2 |
| (Non-volatile content) | 100.0 |

The above components were dissolved in 300 parts methyl ethyl ketone solvent, thereby providing a coating solution comprising by weight 25.0% solids and 75.0% solvent.

The coated articles were tested as in Example 1 and similar results were observed. In addition, the coated articles were exposed to baking lamps immediately following the spraying in order to decrease the drying time required of the enveloped film. It was found that the addition of the stabilizer prevented the partial decomposition of the resins due to exposure to the baking lamps. It has been found that the addition of the stabilizer in an amount up to 6 parts by weight per 100 parts resins is particularly successful in stabilizing the resins.

The finished dried film had a tensile strength of about 2000 lbs./in.$^2$ with an elongation of about 250%. The moisture-vapor transmission rate was about 10 grams per square meter per 24 hours at 95% relative humidity and 100° F. for a film having a thickness of 20 mils.

After being exposed to the accelerated weathering test described in Example 1 for a period of time equal to 6 months' outdoor exposure, the film exhibited a tensile strength of 1800 lbs./in.$^2$ with an elongation of about 220%. The moisture vapor transmission rate remained the same as it was before being exposed to the accelerated weathering test.

A steel projectile coated with a film made in accordance with this example was subjected for 240 hours to a 20% salt spray at 100° F. The film was easily and completely stripped from the projectile which exhibited no trace of corrosion.

*Example 3*

| | Parts by weight |
|---|---|
| (a) VYNW | 8.3 |
| VYNS | 50.0 |
| Santicizer B16 | 12.5 |
| Fractol A | 29.2 |
| (Non-volatile content) | 100.0 |

The above non-volatile components were dissolved in 317 parts methyl ethyl ketone solvent resulting in a coating solution comprising 24% non-volatiles and 76% solvent. The webbing characteristics of the composition were such as to enable the bridging of a circular opening varying from 2 to 4 inches in diameter.

(b) The addition of a 23% solution of Saran F120 (vinylidene chloride-acrylo nitrile copolymer containing vinylidene chloride within the range of 85 to 88 percent) in methyl ethyl ketone solvent in the amount of 20 grams of Saran F120 per 100 grams of the composition (a) above, (16.6 percent), improved the webbing characteristics of the composition to the extent that it was possible to bridge openings having a diameter varying from 16 to 20 inches. The protecting characteristics of the dried film were found to be substantially similar to those of the film disclosed in Example 1.

*Example 4*

| | Parts by weight |
|---|---|
| (a) VYNS | 50 |
| Flexol D. O. P | 15 |
| Fractol A | 34 |
| Stabilizer A | 1 |
| (Non-volatile content) | 100 |

The non-volatile components were dissolved in 300 parts methyl ethyl ketone resulting in a coating solution comprising 25% non-volatiles and 75% solvent. The sprayed film, when thoroughly dry, was found to have a tensile strength of approximately 700 lbs./in.$^2$ and 75 to 80% elongation. The moisture-vapor transmission rate at 95% relative humidity and 100° F. was found to be 10 grams/meter$^2$/24 hours for a film of 20 mils thickness.

(b) A composition as in (a) above, with 15 parts VYNW replacing 15 parts of the 50 parts of VYNS, was prepared. The sprayed film, when thoroughly dry, was found to have a tensile strength of 1000 lbs./in.$^2$ and 75 to 80% elongation. The moisture-vapor transmission rate was 9 grams/meter$^2$/24 hours for a film of 20 mils thickness. Thus, it will be apparent that the addition of VYNW to the composition shown in (a) above increased the tensile strength from 700 to 1000 lbs./in.$^2$ and decreased the moisture-vapor transmission rate from 10 to 9 grams/meter$^2$/24 hours.

*Example 5*

(a) 
| | Parts by weight |
|---|---|
| VYNS | 50 |
| Flexol D. O. P. | 10 |
| Fractol A | 39 |
| Stabilizer A | 1 |
| (Non-volatile content) | 100 |

The non-volatile components were dissolved in 300 parts methyl ethyl ketone resulting in a coating solution comprising 25% non-volatiles and 75% solvent. The sprayed film, when thoroughly dry, was found to have a tensile strength of approximately 750 lbs./in.$^2$ and about 40% elongation. The moisture-vapor transmission rate was 13 grams/meter$^2$/24 hours for a film of 20 mils thickness.

(b) A composition as in (a) above, with 15 parts VYNW replacing 15 parts of the 50 parts VYNS, was prepared. The film was tested as in (a) above and was found to have a tensile strength of 1000 lbs./in.$^2$, an elongation of 35% and a moisture-vapor transmission rate of 9 grams/meter$^2$/24 hours for a film of 20 mils thickness. The addition of the VYNW to the above compound increased the tensile ength 250 lbs./in.$^2$ and decreased the moisture-vapor transmission rate from 13 to 9 grams/meter$^2$/24 hours.

*Example 6*

| | Parts by weight |
|---|---|
| VYNS | 56.0 |
| Santicizer B-16 | 11.6 |
| Saran F120 | 4.7 |
| Rust Ban | 27.7 |
| (Non-volatile content) | 100.0 |

Methyl ethyl ketone solvent was added to the above components until the resulting solution contained 21.5% non-volatiles. The moisture-vapor transmission rate of the dried film of 20 mils thickness was 12 grams/meter$^2$/24 hours, the tensile strength was 1400 lbs./in.$^2$ and the elongation was 160%.

A similar composition having 60.7 parts of VYNS and no Saran F120 therein had an increased moisture-vapor transmission rate (16 grams/meter$^2$/24 hours) and a decreased tensile strength (1100 lbs./in.$^2$) with 100% elongation.

*Example 7*

| | Parts by weight |
|---|---|
| VYNW | 30 |
| Flexol D. O. P. | 15 |
| Fractol A | 54 |
| Stabilizer A | 1 |
| (Non-volatile content) | 100 |

450 parts solvent consisting of 400 parts methyl ethyl ketone and 50 parts cyclohexanone were used to dissolve the components to give a composition having a non-volatile content of 18.2%. The resulting dried film exhibited satisfactory protecting characteristics when tested by the procedure set forth in the preceding examples.

*Example 8*

| | Parts by weight |
|---|---|
| VYNW | 30 |
| Flexol D. O. P. | 15 |
| Fractol A | 44 |
| Stabilizer A | 1 |
| Saran F120 | 10 |
| (Non-volatile content) | 100 |

These components were dissolved as in Example 7 and the finished film exhibited protecting characteristics similar to those in Example 7 above. However, it was found that the webbing characteristics of this coating composition were greatly improved over those of Example 7. Whereas the composition of Example 7 was able to bridge a circular area of 3 inch diameter, the composition containing the Saran F120 successfully bridged a circular area 24 inches in diameter.

*Example 9*

| | Parts by weight |
|---|---|
| VYNU | 12.5 |
| VYNS | 47.5 |
| Flexol D. O. P. | 24.0 |
| Rust Ban | 14.8 |
| Stabilizer A | 1.2 |
| (Non-volatile content) | 100.0 |

VYNU is vinyl chloride-vinyl acetate copolymer containing vinyl chloride in the range between 90.5 and 95 percent. The above non-volatile components were dissolved in 300 parts solvent comprising by weight a mixture of 255 parts methyl ethyl ketone and 45 parts methyl isobutyl ketone. The base webbing layer was identified by including a sufficient quantity of dye to give it a distinct color. The composition was sprayed onto the surface of a major caliber naval gun mount having a volume of approximately 150 cubic feet. After an enveloped webbing of about 10 mils thickness had been obtained with a fine filament spray, the nozzle was adjusted for a heavier spray and an outer layer, having a thickness of about 10 mils and a different color than the base layer, was applied. The spraying was accomplished during exposure to the weather and some of the gaps webbed with the base coating had an area as large as 250 square inches. The coated gun mount was provided with a moisture indicator which indicated, after one month's exposure to weather conditions, that no appreciable moisture vapor transmission had occurred. It was found that the addition of the methyl isobutyl ketone provided an evaporation retardant which is particularly suitable for conditions where the rate of evaporation is high.

It has also been found that the particular components and percentages thereof may be varied in order to improve a particular characteristic or a combination of characteristics which is desired for certain applications. For example, a non-metallic base article may not require a corrosion inhibitor and for such application the hydrophobic substance may be omitted from the coating composition.

It will be understood that after a thin webbed film has been sprayed on the base article and the portion thereof to be protected is completely enveloped, the spraying of the outer coating may be completed with a composition containing less percentage of the Saran F120 or it may be entirely omitted if desired.

The percentage amount of certain of the components may be varied within critical limits. It has been found that the VYNW may be added in any amount which is capable of being dissolved by the particular solvent employed. The Saran F120 may be used in various proportions depending upon the particular characteristics desired of the coating composition.

The invention herein described may be manufactured and used by or for the Government of the United States of America for governmental purposes without the payment of any royalties thereon or therefor.

We claim:

1. A webbable, strippable coating composition comprising as film-forming materials vinyl chloride-vinyl acetate copolymer having a vinyl chloride content ranging from 85 to 95 percent and from 4.7 to not more than 16.6 percent on the non-volatile components of vinylidene chloride-acrylo nitrile copolymer, said two film-forming materials ranging from 30 to 80 percent of the non-volatile components, the balance of the non-volatile components including plasticizer, said components being dissolved in a volatile solvent to give a solution of sprayable viscosity.

2. A webbable, strippable coating composition comprising as film-forming materials vinyl chloride-vinyl acetate copolymer having a vinyl chloride content ranging from 85 to 95 percent and from 4.7 to not more than 16.6 percent on the non-volatile components of vinylidene chloride-acrylo nitrile copolymer having a vinylidene chloride content ranging from 85 to 88 percent, said two film-forming materials ranging from 30 to 80 percent of the non-volatile components, the balance of the non-volatile components including plasticizer, said components being dissolved in a volatile solvent to give a solution of sprayable viscosity.

3. A webbable, strippable coating composition according to claim 2, comprising vinyl chloride-vinyl acetate copolymer having a vinyl chloride content ranging from 85 to 90.5 percent.

4. A webbable, strippable coating composition according to claim 2, comprising vinyl chloride-vinyl acetate copolymer having a vinyl chloride content ranging from 90.5 to 95.0 percent.

5. A webbable, strippable coating composition according to claim 2, comprising on the non-volatile components substantially 30 percent vinyl chloride-vinyl acetate copolymer having a vinyl chloride content ranging from 90.5 to 95.0 percent and substantially 10 percent vinylidene chloride-acrylo nitrile copolymer.

6. A webbable, strippable coating composition comprising as film-forming materials vinyl chloride-vinyl acetate copolymer having a vinyl chloride content ranging from 85 to 90.5 percent, vinyl chloride-vinyl acetate copolymer having a vinyl chloride content ranging from 90.5 to 95 percent and from 4.7 to not more than 16.6 percent on the non-volatile components of vinylidine chloride-acrylo nitrile copolymer, said three film-forming materials ranging from 30 to 80 percent of the non-volatile components, the balance of the non-volatile components including plasticizer, said components being dissolved in a volatile solvent to give a solution of sprayable viscosity.

7. A webbable, strippable coating composition according to claim 6, comprising on the non-volatile components from 40.9 to 50 percent of vinyl chloride-vinyl acetate copolymer having a vinyl chloride content ranging from 85 to 90.5 percent, from 13.6 to 8.3 percent of vinyl chloride-vinyl acetate copolymer having a vinyl chloride content ranging from 90.5 to 95 percent, and from 6.8 to 16.6 percent of vinylidene chloride-acrylo nitrile copolymer.

8. A webbable, strippable coating composition comprising on the non-volatile components as film-forming materials substantially 56 percent of vinyl chloride-vinyl acetate copolymer having a vinyl chloride content ranging from 85 to 90.5 percent and substantially 4.7 percent of vinylidene chloride-acrylo nitrile copolymer having a vinylidene chloride content ranging from 85 to 88 percent, the balance of the non-volatile components including plasticizer, said components being dissolved in a volatile solvent to give a solution of sprayable viscosity.

9. A webbable, strippable coating composition comprising as film forming materials vinyl chloride-vinyl acetate copolymer having a vinyl chloride content ranging from 85 to 95 percent and from 4.7 to not more than 16.6 percent on the non-volatile components of vinylidene chloride-acrylo nitrile copolymer having a vinylidene chloride content ranging from 85 to 88 percent, said two film-forming materials ranging from 30 to 80 percent of the non-volatile components, a non-drying hydrophobic exudable substance, not more than 6 percent of stabilizer on the content of resin, and a plasticizer characterized by its ability to impart elasticity to the composition when dried in the form of a film, said components being dissolved in a volatile solvent to give a solution of sprayable consistency.

10. A webbable, strippable coating composition comprising as film-forming materials vinyl chloride-vinyl acetate copolymer having a vinyl chloride content ranging from 85 to 95 percent and from 4.7 to not more than 16.6 percent on the non-volatile components of vinylidene chloride-acrylo nitrile copolymer having a vinylidene chloride content ranging from 85 to 88 percent, the said two film-forming materials ranging from 30 to 80 percent of the non-volatile components, the balance of the non-volatile components including plasticizer, said components being dissolved in a volatile solvent comprising methyl ethyl ketone to give a solution of sprayable consistency.

11. A webbable, strippable coating composition comprising as film-forming materials vinyl chloride-vinyl acetate copolymer having a vinyl chloride content ranging from 85 to 95 percent and from 4.7 to not more than 16.6 percent on the non-volatile components of vinylidene chloride-acrylo nitrile copolymer having a vinylidene chloride content ranging from 85 to 88 percent, the said two film-forming materials ranging from 30 to 80 percent of the non-volatile components, the balance of the non-volatile components including plasticizer, said components being dissolved in a volatile solvent of a major portion of methyl ethyl ketone with methyl isobutyl ketone to give a solution of sprayable viscosity.

WILLIAM HENRY HOLST.
GEORGE RUSSELL HERSAM.

REFERENCES CITED

The following references are of record in the file of this patent:

UNITED STATES PATENTS

| Number | Name | Date |
| --- | --- | --- |
| 2,215,340 | Vasen | Sept. 17, 1940 |
| 2,238,020 | Hanson | Apr. 8, 1941 |
| 2,396,125 | Price | Mar. 5, 1946 |